US005264024A

United States Patent [19]
Bosvot et al.

[11] Patent Number: 5,264,024
[45] Date of Patent: Nov. 23, 1993

[54] METHOD FOR DEGASSING AN AQUEOUS COMPOSITION AND DEVICE FOR CARRYING OUT THIS METHOD

[75] Inventors: Jean-Claude Bosvot, Sassenay; Jacques Le Faou, Chalon Sur Saone, both of France

[73] Assignee: Eastman Kodak Company, Rochester, N.Y.

[21] Appl. No.: 853,736

[22] PCT Filed: Dec. 7, 1990

[86] PCT No.: PCT/FR90/00890

§ 371 Date: May 27, 1992

§ 102(e) Date: May 27, 1992

[87] PCT Pub. No.: WO91/10164

PCT Pub. Date: Jul. 11, 1991

[30] Foreign Application Priority Data

Dec. 26, 1989 [FR] France ............ 89 17515

[51] Int. Cl.[5] ............ B01D 19/00
[52] U.S. Cl. ............ 95/266; 95/260
[58] Field of Search ............ 55/55, 199, 185

[56] References Cited

U.S. PATENT DOCUMENTS

| | | | |
|---|---|---|---|
| 2,704,658 | 3/1955 | Gordon | 55/203 |
| 3,793,805 | 2/1974 | Hoffman | 55/52 |
| 3,797,551 | 3/1974 | Herzhoff et al. | 159/38 |
| 3,856,483 | 12/1974 | Rumpf et al. | 55/38 |
| 4,063,718 | 12/1977 | Koch | 356/75 |
| 4,318,839 | 3/1982 | Newbould et al. | 524/538 |
| 4,382,404 | 5/1983 | Hawley et al. | 99/472 |
| 4,607,797 | 8/1986 | Enikolopow et al. | 241/23 |

FOREIGN PATENT DOCUMENTS

| | | |
|---|---|---|
| 0058353A1 | 8/1982 | European Pat. Off. . |
| 3406600A1 | 8/1984 | Fed. Rep. of Germany . |
| 54-121728 | 9/1979 | Japan . |
| 500507 | 1/1971 | Switzerland . |
| 1325390 | 8/1973 | United Kingdom . |

*Primary Examiner*—Robert Spitzer
*Attorney, Agent, or Firm*—Carl F. Ruoff

[57] ABSTRACT

The present invention is a method for degassing an aqueous composition of chunked gelatin. Prior to melting the gelatin chunks, the gelatin is subjected to a pressure near the steam pressure corresponding to the temperature of the gelatin chunks. Application of this pressure degasses the gelatin chunks to that they can be sent directly to the melter and to the coating station.

5 Claims, 1 Drawing Sheet

METHOD FOR DEGASSING AN AQUEOUS COMPOSITION AND DEVICE FOR CARRYING OUT THIS METHOD

FIELD OF THE INVENTION

The invention relates to an apparatus and a process for degassing materials, particularly emulsions obtained from chunks of solidified photographic emulsion.

BACKGROUND OF THE INVENTION

Numerous materials in the chemical, pharmaceutical, foodstuff and other related industries, particularly emulsions, suspensions, high viscosity slurries and liquids, etc . . . contain air or dissolved gases or in the form of small bubbles, which during manufacturing, are necessarily incorporated into the liquid, but must not be contained in the final material. Thus, for example, in the case of photographic emulsions, gas bubbles significantly affect the quality of films or photographic papers manufactured with these emulsions, since the bubbles or small gas bubbles interfere with the volume current in the coating devices, thus causing stripes which render the photographic materials useless.

According to the British patent application 2 008 971, there is provided a method and a device for subjecting liquid, with which a gas is simultaneously transported, to a first reduced-pressure degassing while, in a second stage, this liquid is further degassed by means of a centrifugal rotor, in order to be collected in the form of an annular liquid layer into a pumping element and then to be discharged by means of centrifugal forces against the reduced pressure prevailing in the system.

This device and method exhibits significant drawbacks, because the liquid collects and flows between the centrifugal rotor and the housing walls, as well as between the pump rotors and the walls, this liquid being thus exposed to significant shearing forces. So, the friction generates an uncontrollable emission of heat. The resulting heat involves formation of incrusted aggregates and, when these latter break up, they form small chunks, which in the case of photographic emulsions exhibit more significant drawbacks than small bubbles. If heating is excessive, the quality of the photographic emulsion is adversely affected. Since the liquid is discharged at the periphery of the pump, significant disturbances in the flow occur, which may result again in the formation of small bubbles.

Likewise, according to the German patent 2 147 124, there is provided a device for degassing liquids, wherein the liquid is in vacuo processed in a centrifuge, this liquid spreading out to form a film flowing on the inner wall of the centrifuge rotor, in order to be then distributed into a fraction having few bubbles and a fraction having many bubbles. In order that the bubble-rich fraction may then be separated from the bubble-poor fraction, where the liquid leaves the rotor, directing towards the outside, a blade-shaped overflow element is arranged on one side where the bubble-rich liquid flows, which is fed back again into the rotor in order to be processed, while, on the other side, the relatively bubble-poor liquid is removed at a decreasing peripheral rate. In fact, in comparison with the liquid fed into the rotor before degassing, the liquid discharged there, has a lower bubble content, but sufficient bubbles removal is not achieved.

In fact, all these techniques relate to the degassing of liquid materials. However, for some time, particularly in the field of photographic materials, the techniques for manufacturing the emulsion use cooled gelled mixtures of various components in an aqueous coating composition.

French patent application 2 626 088 discloses a method for providing a photographic composition suitable to form a layer on a support, said composition containing at least a silver halide emulsion as well as the required finishing addenda. The method according to this application consists in:

1) individually preparing, or by group of compatible compounds, various components of the desired layer, comprising at least a silver halide emulsion and solutions or dispersions containing one or more finishing addenda and/or gelatin, and chilling these components in order to solidify each of them, 2) cutting them into chunks, 3) cold-blending, in a solid state, the selected components according to the formulation of the desired layer, or of a portion of this layer, 4) liquefying the resulting solid composition in order to feed it into the coating station.

The components individually prepared in step (1) can be individually cold-stored, either after step (1) or step (2) in the form of chunks, or both after step (1) and step (2).

The mean volume of the chunks must not exceed 2 cm3, in order that the subsequent solid mixture is homogeneous, and preferably, it is less than 0.5 cm3.

In this patent application, the composition is liquefied by means of a device including for example an Archimedean screw and a pump forcing the solid composition into a heat exchanger. However, with such a method, in order to avoid bubbles at the outlet of the melt emulsion, a degassing device of the type described in the EP-A-58 353, must be used. EP-A-58 353 discloses a method and a device wherein the liquid is spread out as a thin film, while applying to it a sudden partial vacuum. The liquid film is subjected to an absolute pressure of 8100 Pa. But, under these pressure conditions, even if bubble formation is reduced, the melt emulsion comprises a large amount of dissolved air and is substantially saturated.

Thus, it is an object of the present invention to improve the degassing of a composition before forwarding it to the coating station.

It is yet another object of the present invention to provide a more simple and more reliable degassing device than those used up to now in the art.

It is yet another object of the present invention to reduce to a minimum the interstitial air amount (i.e. between the solid chunks) and to decrease also the dissolved air amount in the composition itself.

Other objects will appear in the following detailed disclosure.

SUMMARY OF THE INVENTION

The objects of the present invention are achieved by means of a degassing method for a mixture of various components in an aqueous composition, in the form of solid chunks, characterized in that a pressure near the steam pressure corresponding to the temperature of said mixture, is applied, before melting, to said mixture.

The method according to the invention is carried out by means of a degassing device for a mixture of various components in an aqueous composition, in the form of solid chunks, including:

1) a feed storage containing the solid chunks forming the mixture, 2) a first and a second conveying device for the mixture, 3) a degassing device for the composition, 4) a melting device for the mixture, said apparatus being characterized in that the degassing device for the composition includes a vacuum chamber located upstream of the melting device and wherein a pressure near the steam pressure corresponding to the temperature of the mixture, is applied to said mixture, said chamber including an inlet opening whereby the solid mixture coming from the feed storage and transported by said first conveying means is fed into said chamber, and an outlet opening whereby the solid mixture is discharged from said chamber and is transported by means of said second conveying means towards the melting device of the mixture.

The following detailed disclosure will be illustrated with reference to a single figure showing a liquefier including a degassing device according to the present invention.

BRIEF DESCRIPTION OF THE DRAWINGS

The device shown in FIG. 1 mainly includes a feed storage 1, a degassing device 4, conveying means 2 and 3 in order to transport the mixture and a melting device 5.

DETAILED DESCRIPTION OF PREFERRED EMBODIMENT

Figure 1:
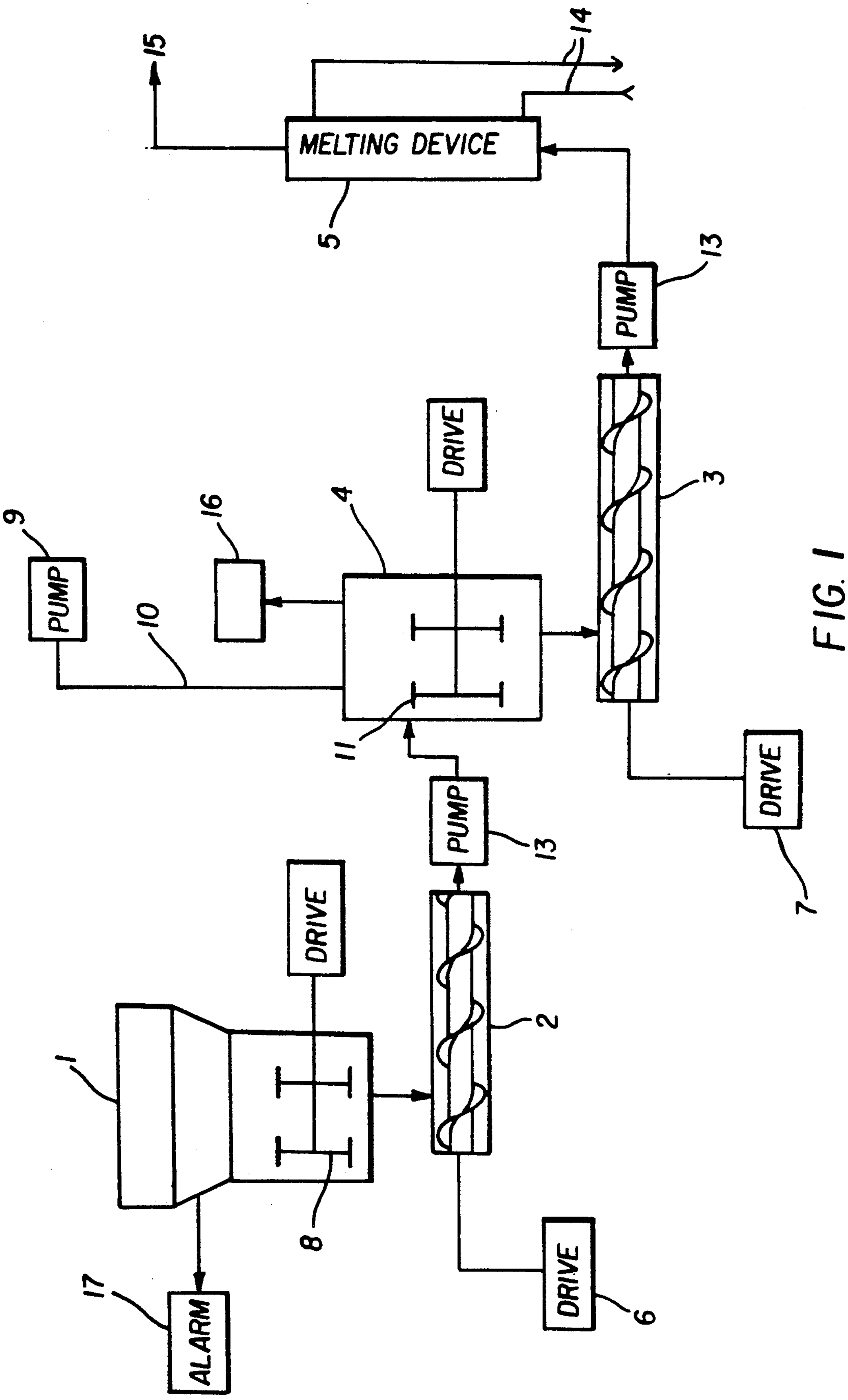

The feed storage (1) is fed with a mixture of various components in an aqueous composition, in the form of solid chunks. In a particular embodiment, this mixture includes a photographic silver halide composition, suitable to be applied on a support to form a layer. The method for obtaining these solid chunks, such as described in the French patent application 2 626 088 includes individually preparing the various components of the layer being obtained, comprising at least a silver halide emulsion, and solutions or dispersions containing one or more finishing addenda and/or gelatin, chilling these components to solidify each of them, cutting them into chunks, cold-blending, in a solid state, the selected components according to the formulation of the desired layer. The feed storage comprises at its bottom a device (8) with rotating blades, in order to avoid the formation of a vault of material at the outlet of said feed storage.

The first device (2) allows transportation of the mixture from the feed storage (1) to the degassing device (4), which will be discussed with more detail below. The second one allows transportation of the mixture from the degassing device (4) towards a melting device (5) for the mixture, which will be discussed in detail below. According to an embodiment, these conveying devices comprise a conventional Archimedean screw. These two Archimedean screws (2), (3) are rotated by the respective motors (6) and (7) and are ended respectively by an airtight device (13) which can be, for example, a MOINEAU pump.

According to the invention, the degassing device comprises a vacuum chamber (4) between the two conveying means and upstream of the melting device (5). Inside this chamber, a pressure near the steam pressure corresponding to the temperature of the mixture is applied to said mixture, said chamber comprising an inlet opening whereby the solid mixture coming from the feed storage and transported by said first conveying means (2) is fed into said vacuum chamber (4) and an outlet opening whereby the solid mixture is removed from said chamber and transported by said second conveying means (3) towards the melting device (5). The absolute pressure inside the vacuum chamber ranges from 1000 to 2000 Pa and preferably from 1000 to 1500 Pa. A partial vacuum is applied to the vacuum chamber by means of a pump (9) connected to the chamber by a pipe (10). The chamber (4) comprises a stirring device (11) with rotating blades. The conveying means (3) as well as the stirring device (11) are rotatably mounted by means of bearings (not shown), allowing application of a partial vacuum to the chamber (4). This vacuum chamber (4) reduces to a minimum the interstitial amount of air (i.e. between the chunks forming the mixture) and reduces the amount of air dissolved in the composition itself.

The melting device (5) is located downstream of the vacuum chamber and comprises a heat exchanger fed, for example, by a thermal liquid circuit (14). The emulsion is melted at about 40° C. and is delivered by the pipe (15). According to a particular embodiment, the heat exchanger is multitubular. Its exchange surface is 3.2 m2. The heating fluid is water whose temperature is adjusted according to the flow rate of the composition to be melted; but preferably lower than 60° C. in order to insure a more regular heating.

In a preferred embodiment, the motor rotatably driving the conveying means (3) is bound to the flow rate of the melt mixture delivered by pipe (15). Likewise, the motor rotatably driving the conveying means (2) can be bound to the volume contained in the vacuum chamber (4) by means of a probe (6). An alarm device (17) can also be used in order to indicate an insufficient filling level of the feed storage (1).

Tests showed that such devices can be operated at flow rates ranging from 1 to 20 liters of mixture per minute. With such devices, it is possible to reduce the level of air dissolved in the mixture below 50% of the saturation level at atmospheric pressure. Tests also showed that the best results were obtained when a partial pressure ranging from 5 to 10 mn is applied to the solid mixture.

EXAMPLE 1

A photographic dispersion of the type used for color paper is used. The viscosity of the melt composition is about 100 cp at 40° C. The speed of Archimedean screws is adjusted so as to obtain a flow rate of the dispersion once liquefied of 4 l/mn. The absolute pressure of chamber (4) is about 1500 Pa. When said pressure is applied to chamber 4 and after melting at 40° C., the amount of air introduced and of dissolved oxygen corresponds to 0.04% and to 1.6 ppm respectively.

EXAMPLE 2

A gelatin broth comprising 15% dry gelatin is used. The flow-rate is 4 l/mn and the pressure is 1500 Pa. The viscosity of the melt composition is about 70 cp at 40° C. Dissolved oxygen is 1.4 ppm at 40° C.

EXAMPLE 3

A gelatin broth comprising 7% dry gelatin is used. The flow-rate is 12 l/mn and the pressure ranges from 1200 to 1400 Pa. The viscosity of the melt composition is 7 cp at 40° C. Dissolved oxygen is 3.2 ppm at 40° C. and the amount of air introduced is 0.01%.

EXAMPLE 4

A composition of the type used in Example 3 is employed, but this time, no vacuum is applied inside chamber 4. Dissolved oxygen is 6.3 ppm at 40° C. (saturation) and the amount of air introduced is 5%.

We claim:

1. A method for degassing a photographic emulsion comprising:

a) feeding a vacuum chamber with the photographic emulsion, the photographic emulsion being in solid chunk form and each chunk having a volume of 2.5 $cm^3$ or less;

b) applying a pressure to the photographic emulsion in solid chunk form, the pressure being approximately the steam pressure corresponding to the temperature of the photographic emulsion;

c) transporting said photographic emulsion out of the vacuum chamber; and d) melting said photographic emulsion.

2. The method according to claim 1 wherein the volume of each chunk is less than or equal to 0.5 $cm^3$.

3. A method according to claim 1 wherein the pressure applied to the photographic emulsion in step (b) is from about 1000 Pa to about 2000 Pa.

4. The method according to claim 3 wherein the pressure applied to the photographic emulsion in step (b) is from about 1800 Pa to about 1500 Pa.

5. The method according to claim 1 wherein the pressure applied to the photographic emulsion in step (b) ranges from about 5 minutes to about 10 minutes.

* * * * *